United States Patent
Demant et al.

(10) Patent No.: US 10,506,043 B2
(45) Date of Patent: Dec. 10, 2019

(54) RAPID CLIENT-SIDE COMPONENT PROCESSING BASED ON COMPONENT RELATIONSHIPS

(71) Applicant: SAP SE, Walldorf (DE)

(72) Inventors: Hilmar Demant, Karlsdorf (DE); Sebastian Droll, Heidelberg (DE); Joachim Fitzer, Schriesheim (DE); Ioannis Grammatikakis, Maxdorf (DE); Jan Heiler, Walldorf (DE); Juergen Sattler, Wiesloch (DE); Frank Schertel, Mannheim (DE); Markus Viol, Walldorf (DE); Thorsten Weber, Mannheim (DE)

(73) Assignee: SAP SE, Walldorf (DE)

( * ) Notice: Subject to any disclaimer, the term of this patent is extended or adjusted under 35 U.S.C. 154(b) by 307 days.

(21) Appl. No.: 15/344,977

(22) Filed: Nov. 7, 2016

(65) Prior Publication Data

US 2017/0054808 A1    Feb. 23, 2017

Related U.S. Application Data

(62) Division of application No. 12/841,856, filed on Jul. 22, 2010, now Pat. No. 9,491,238.

(51) Int. Cl.
*H04L 29/08* (2006.01)
*H04L 29/06* (2006.01)

(52) U.S. Cl.
CPC .......... *H04L 67/1097* (2013.01); *H04L 67/32* (2013.01); *H04L 67/42* (2013.01)

(58) Field of Classification Search
CPC .......... G06F 17/30091; G06F 17/3002; G06F 17/30067; G06F 3/0641; G06F 3/0683;
(Continued)

(56) References Cited

U.S. PATENT DOCUMENTS 5,724,589 A    3/1998 Wold
6,113,649 A    9/2000 Govindaraj
(Continued)

OTHER PUBLICATIONS

Restriction Requirement for U.S. Appl. No. 12/841,856, dated Jun. 11, 2012, 6 pages.
(Continued)

*Primary Examiner* — Sargon N Nano
(74) *Attorney, Agent, or Firm* — Mintz Levin Cohn Ferris Glovsky and Popeo, P.C.

(57) ABSTRACT

A client database manager can cause a memory of a client device on a client side of a network to store a first component, a second component, and a relationship value representing a dependent relationship between the first component and the second component. A client processing module can cause a processor to receive, after the storing, a request to process the first component at the client device. The client database manager can send to the server side of the network a request for an update of at least one of the first component or the second component. The client processing module can cause the processor to process at the client device, before receiving a response to the request for the update from the server side of the network, at least a portion of the first component and at least a portion of the second component based on the relationship value.

20 Claims, 10 Drawing Sheets

(58) Field of Classification Search
CPC .......... G06F 11/2056; G06F 17/30321; G06F 17/30911; Y10S 707/99943; H04L 67/1097; H04L 67/10; H04L 67/1002; H04L 67/34

See application file for complete search history.

(56) References Cited

U.S. PATENT DOCUMENTS

| | | | |
|---|---|---|---|
| 6,205,465 B1 * | 3/2001 | Schoening | G06F 8/456 |
| | | | 709/223 |
| 6,222,537 B1 * | 4/2001 | Smith | G06F 8/38 |
| | | | 715/762 |
| 6,550,061 B1 | 4/2003 | Bearden et al. | |
| 6,684,383 B1 * | 1/2004 | Natori | G06F 8/36 |
| | | | 717/107 |
| 7,234,132 B2 | 6/2007 | Lam | |
| 7,418,484 B2 * | 8/2008 | Presley | H04L 41/0266 |
| | | | 709/220 |
| 7,478,093 B2 | 1/2009 | Moulckers et al. | |
| 7,493,594 B2 * | 2/2009 | Shenfield | G06F 8/10 |
| | | | 717/102 |
| 7,617,224 B2 | 11/2009 | Moulckers et al. | |
| 7,617,483 B2 | 11/2009 | Vigelius et al. | |
| 7,770,121 B2 | 8/2010 | Jain et al. | |
| 7,941,784 B2 * | 5/2011 | Shenfield | G06F 9/445 |
| | | | 717/107 |
| 8,050,958 B2 | 11/2011 | Woehler et al. | |
| 8,555,247 B2 | 10/2013 | Keller et al. | |
| 2007/0136326 A1 * | 6/2007 | McClement | G06Q 10/10 |
| 2009/0106187 A1 | 4/2009 | Ichino | |
| 2009/0292524 A1 | 11/2009 | Anne et al. | |
| 2009/0307650 A1 * | 12/2009 | Saraf | G06F 8/65 |
| | | | 717/101 |
| 2010/0169875 A1 | 7/2010 | Stewart | |
| 2011/0087650 A1 * | 4/2011 | Mackay | G05B 15/02 |
| | | | 707/722 |
| 2014/0047413 A1 * | 2/2014 | Sheive | H04L 65/403 |
| | | | 717/110 |

OTHER PUBLICATIONS

Response to Restriction Requirement for U.S. Appl. No. 12/841,856, filed Jul. 10, 2012, 11 pages.

Non-Final Office Action for U.S. Appl. No. 12/841,856, dated Oct. 23, 2012, 18 pages.

Non-Final Response for U.S. Appl. No. 12/841,856, filed Feb. 18, 2013, 16 pages.

Final Office Action for U.S. Appl. No. 12/841,856, dated Jun. 5, 2013, 17 pages.

Notice of Allowance for U.S. Appl. No. 12/841,856, dated Jul. 13, 2016, 6 pages.

* cited by examiner

500

| Component Identifiers 510 | Index Values 520 | Relationship Values 530 | Priority Values 540 |
|---|---|---|---|
| $P_1$ | $IV_1$ | $P_2, P_3$ | Q1 |
| $P_2$ | $IV_2$ | — | — |
| $P_3$ | $IV_3$ | $P_5$ | Q1 |
| $P_4$ | $IV_4$ | $P_5$ | Q2 |
| $P_5$ | $IV_5$ | — | — |
| ⋮ | ⋮ | ⋮ | ⋮ |
| $P_N$ | $IV_N$ | — | — |

FIG. 5

RAPID CLIENT-SIDE COMPONENT PROCESSING BASED ON COMPONENT RELATIONSHIPS

CROSS-REFERENCE TO RELATED APPLICATION

This application is a divisional of, and claims priority to, U.S. patent application Ser. No. 12/841,856, filed on Jul. 22, 2010, entitled "RAPID CLIENT-SIDE COMPONENT PROCESSING BASED ON COMPONENT RELATIONSHIPS", which is incorporated herein by reference in entirety.

TECHNICAL FIELD

This description relates to component execution at a network client.

BACKGROUND

In a client-server computing paradigm, components (e.g., application components) can be efficiently maintained (e.g., stored, processed) at a server (e.g., a server device) on a server side of a network while the server may provide access to the components and their output on an as-needed basis to clients (e.g., client devices) where they may be as efficiently maintained. The components can be, for example, user interface components, stand-alone applications, etc. In this computing paradigm, a client application running on a client, such as a personal computer, can be configured to interface with and request certain components from a server within a server farm. The client application can send commands and requests to the server, while the server can execute the commands and return the requested components to the client. Although this computing paradigm can be implemented to efficiently use the relatively large resources of the server for computationally expensive operations related to the components while preserving the relatively limited computing of the client for less intensive processing (e.g., display, execution), round-trip request/response cycles between the client and the server can significantly impact performance at the client. Specifically, multiple request/response cycles between the client and server may need to be performed to retrieve several different components that are related to one another. In this scenario, processing of the components at the client may be delayed as the request/response cycles between the client and server are being performed, and the computing resources of the client may be underutilized.

SUMMARY

According to one general aspect, a computer system may include instructions stored on a non-transitory computer-readable storage medium. The computer system may include a client database manager configured to cause a memory of a client device on a client side of a network to store a first component, a second component, and a relationship value representing a dependent relationship between the first component and the second component. The computer system may also include a client processing module configured to cause a processor to receive, after the storing, a request to process the first component at the client device. The client database manager may be configured to send to the server side of the network, in response to the request to process the first component, a request for an update of at least one of the first component or the second component. The client processing module may be configured to cause the processor to process at the client device, in response to the request to process the first component and before receiving a response to the request for the update from the server side of the network, at least a portion of the first component and at least a portion of the second component based on the relationship value.

According to another general aspect, a non-transitory computer-readable storage medium may store code representing instructions that when executed are configured to cause a processor to perform a process. The code may comprise code to receive a request to process a component at a client device on a client side of a network, and send, to a server device on a server side of the network, a request to retrieve the component. The code may also include code to receive, in response to the request to retrieve the component, a plurality of relationship values and a plurality of components including the component where each relationship value from the plurality of relationship values can represent at least a portion of a dependent relationship between one component from the plurality of components and another component from the plurality of components. The code may also include code to store the plurality of relationship values in a relationship metadata database in a memory of the client device where the relationship metadata database at the client device may mirror at least a portion of a relationship metadata database maintained at the server device.

According to another general aspect, a method may include executing instructions recorded on a non-transitory computer-readable storage media using at least one processor. The method may include determining a plurality of hierarchical dependencies of a set of subsidiary components with respect to a primary component, and defining on a server side of a network a set of relationship values collectively representing the plurality of hierarchical dependencies of the set of subsidiary components with respect to the primary component. The method may include receiving from the client side of the network a request for the primary component. The method may also include sending to the client side of the network, and in response to the request for the primary component, the primary component, the set of subsidiary components, and the set of relationship values.

The details of one or more implementations are set forth in the accompanying drawings and the description below. Other features will be apparent from the description and drawings, and from the claims.

BRIEF DESCRIPTION OF THE DRAWINGS

FIG. 5 is a diagram that illustrates an example of data stored in a metadata database, according to an embodiment.

DETAILED DESCRIPTION

Figure 1:
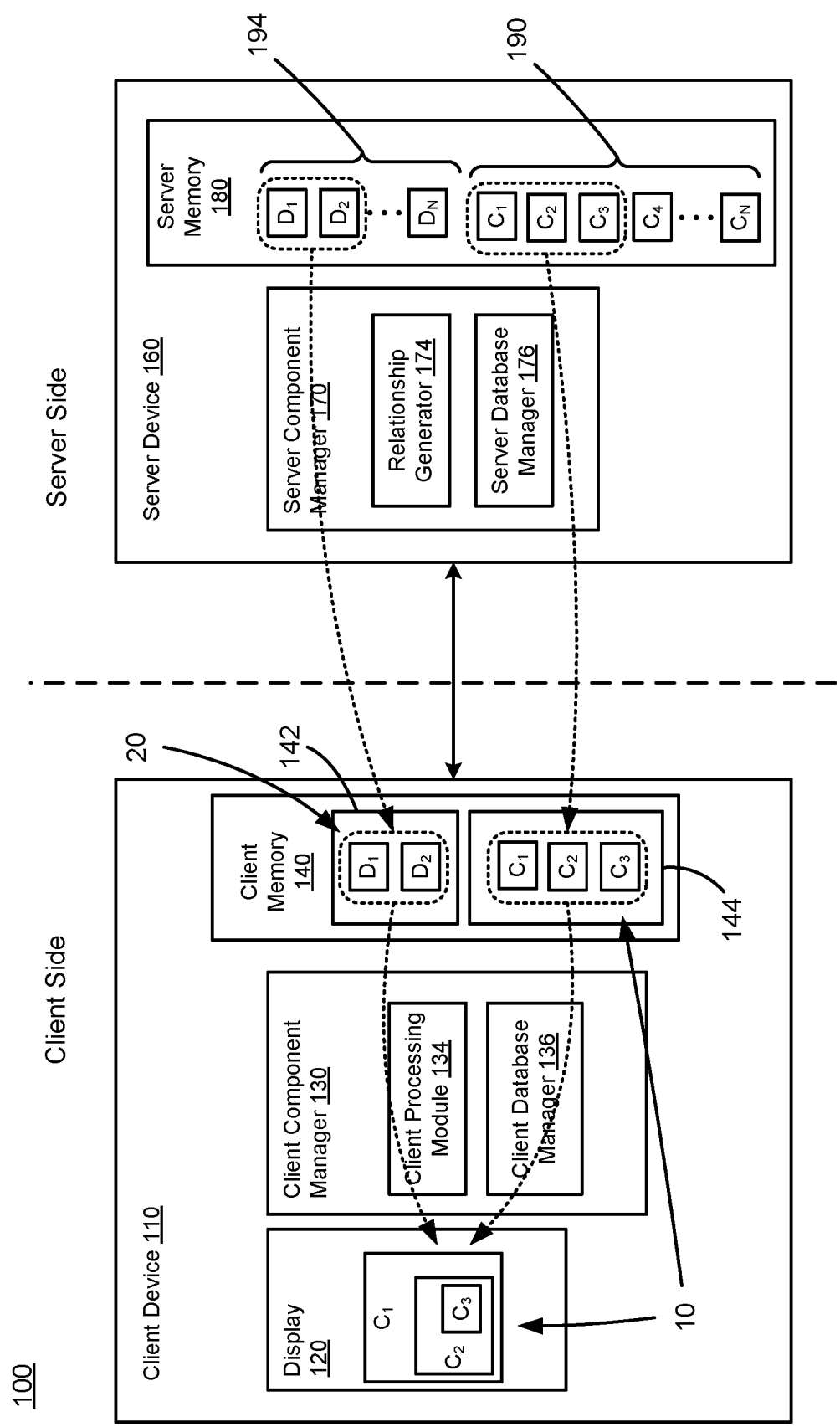
FIG. 1 is a block diagram of a network including a client device and a server device.

FIG. 1 is a block diagram of a network 100 including a client device 110 and a server device 160. As shown in FIG. 1, the client device 110, which is on a client side of the network 100, includes a display 120, a client component manager 130, and a client memory 140. The client component manager 130 includes a client processing module 134 and a client database manager 136. The server device 160, which is on a server side of the network 100, includes a server component manager 170 and a server memory 180. The server component manager 170 includes a relationship generator 174 and a server database manager 176.

The client device 110 is configured to process a set of components 10 associated with an application (e.g., a web-based application, a business application) without requesting each individual component from the set of components 10 from the server device 160 each time one or more of the components 10 is triggered for processing (e.g., display, execution) at the client device 110. The client device 110 is configured to process the set of components 10 based on a set of relationship metadata 20. Specifically, the client processing module 134 of the client component manager 130 of the client device 110 can initially request and receive the set of components 10 and the set of relationship metadata 20 in an efficient fashion in a group (e.g., in a group using a single request/response cycle). After the set of components 10 and the set of relationship metadata have been received, the client processing module 134 can be configured to trigger processing of the set of components 10 based on the set of relationship metadata 20. In some embodiments, each component from the set of components 10 can be referred to as an application component and the set of components 10 can be referred to as a set of application components.

One or more components from the set of components 10 can be, for example, a user interface component associated with an application (not shown) and can be configured for display (e.g., rendering) in the display 120. One or more components from the set of components 10 can be, or can include, any type of executable software module such as a computer program based on, but not limited to, micro-code or micro-instructions, machine instructions, such as produced by a compiler, code used to produce a web service, and files containing higher-level instructions that are executed by a computer using an interpreter. For example, the components from the set of components 10 may be implemented using Java, C++, or other programming languages (e.g., object-oriented programming languages) and development tools. In some embodiments, one or more of the components from the set of components 10 can have, or can be, a background process with functionality that is not visible (i.e., not displayed) on the display 120. In some embodiments, the set of components 10 can define at least a portion of one or more applications or can be associated with one or more applications of the client device 110 and/or the server device 160. More details about components such as each of the component from the set of components 10 are described in connection with, for example, FIG. 3.

Processing of one or more of the components from the set of components 10 can include triggering processing of at least a portion the component(s) 10. In some embodiments, processing of one or more of the components 10 can include executing and/or otherwise displaying (e.g., rendering) the component(s) 10 on the display 120. In some embodiments, processing of one or more of the components 10 can include manipulation of the component(s) 10 based on an instruction associated with the component(s) 10.

As shown in FIG. 1, the client device 110 can be configured to locally store the set of components 10, which is a subset of components 190 stored in the server memory 180 of the server 160, and store the set of relationship metadata 20, which is a subset of relationship metadata 194 stored in the server memory 180 of the server device 160. As shown in FIG. 1, the relationship metadata 194 includes relationship values $D_1$ through $D_N$, and the components 190 include components $C_1$ through $C_N$. Because the set of components 10 and the set of relationship metadata 20 is stored locally at the client device 110, the set of components 10 can be processed at the client device 110 with a faster processing (e.g., display, execution) time than if each of the components from the set of components 10 and/or the set of relationship metadata 20 associated with the set of components 10 were retrieved (from the components 190 and/or the relationship metadata 194, respectively) each time processing of any one of the components from the set of components 10 is requested.

As shown in FIG. 1, the components 10 are locally stored in a component database 144 in the client memory 140, and the set of relationship metadata 20 is stored in a metadata database 142 in the client memory 140. The component database 144 can be stored in a portion of the client memory 140 allocated for storage of components, and the metadata database 142 can be stored in a portion of the client memory 140 allocated for storage of relationship metadata such as the set of relationship metadata 20.

Although not shown, the client memory 140 can be configured to store components in addition to the set of components 10 in the component database 144. Also, the client memory 140 can be configured to store relationship metadata in addition to the set of relationship metadata 20 in the metadata database 142.

The client database manager 136 of the client database manager 130 of the client device 110 is configured to manage the client memory 140 of the client device 110. Specifically, the client database manager 136 can be configured to manage storage of data within the client memory 140. For example, in some embodiments, the component database 144 and/or the metadata database 142 can be maintained by the client database manager 136. The client database manager 130 can be configured to handle (e.g., reserve) allocation of space within the client memory 140 for storage of the set of components 10 within the component database 144 and/or the set of relationship metadata 20 in the metadata database 142.

The set of relationship metadata 20 can include information about the relationship(s) between one or more of the components from the set of components 10 with another component from the set of components 10. For example, the set of relationship metadata 20 can include relationship values (i.e., relationship value $D_1$ and relationship value $D_2$) that represent dependencies between the components from the set of components 10, processing order (e.g., execution order) of one or more portions of the set of components 10, processing instructions (e.g., execution instructions) related to the set of components 10, and/or so forth.

Accordingly, the client processing module 134 can be configured to use the set of relationship metadata 20 to process the set of components 10 as shown in the display 120 of the client device 110. In other words, the set of relationship metadata 20 can be configured to trigger the client processing module 134 to trigger processing of the set of components 10 as shown in FIG. 1. In the embodiment shown in FIG. 1, the set of components includes component $C_1$, component $C_2$, and component $C_3$, and the set of relationship metadata 20 includes relationship values $D_1$ and $D_2$.

As shown in FIG. 1, the components 10 have a nested relationship when displayed in display 120. Specifically, component $C_3$ is visually nested within component $C_2$ when displayed within the display 120, and component $C_2$ is visually nested within component $C_1$ when displayed within the display 120. In this embodiment, relationship value $D_1$ can be used by the client processing module 134 to trigger processing of component $C_3$ in a visually nested fashion within component $C_2$, and relationship value $D_2$ can be used by the client processing module 134 to trigger processing of component $C_2$ in a visually nested fashion within component $C_1$. In this case, because the components $C_2$ and $C_3$ are nested within the component $C_1$, the component $C_1$ can be referred to as a main or primary component and the components $C_2$ and $C_3$ can be referred to as secondary or subsidiary components. Because the components from the set of components 10 are related to one another they can be referred to as related components. More details related to relationships (e.g., dependent relationships) between components and relationship metadata are discussed in connection with, for example, FIGS. 3 and 5.

Figure 2:
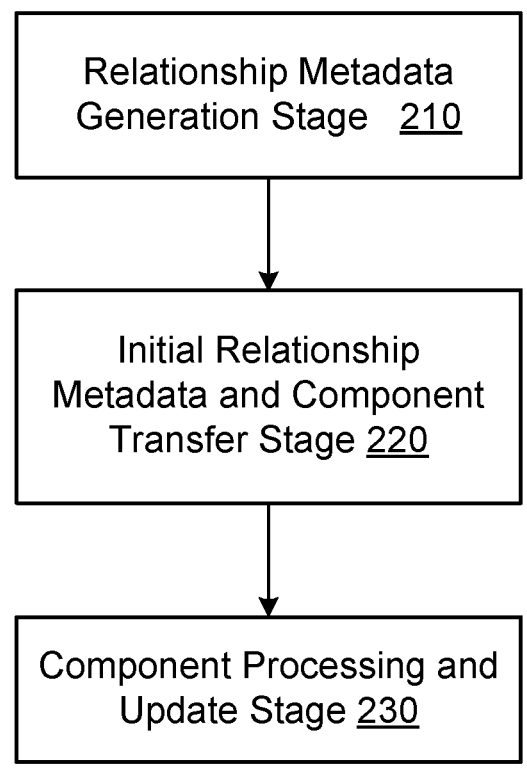
FIG. 2 is a flowchart that illustrates stages of operation of the client device and the server device shown in FIG. 1.

The operation of the client device 110, the operation of the server device 160, and the interactions between the client device 110 and the server device 160 can be described in the context of at least one of several stages. The stages of operation are shown in the flowchart shown in FIG. 2. The stages shown in FIG. 2 are a Relationship Metadata Generation Stage 210 (can be referred to as the Generation Stage 210), an Initial Relationship and Metadata Component Transfer Stage 220 (can be referred to as the Transfer Stage 220), and a Component Processing and Update Stage 230 (can be referred to as the Component Processing and Update Stage 230). The stages of operation shown in FIG. 2 will be discussed below in the context of the components shown in FIG. 1.

During the Generation Stage 210 (shown in FIG. 2), the components 190 are stored in the server memory 180. One or more of the components 190 can be associated with one or more applications to be processed at one or more client devices (such as client device 110) and/or one or more server devices (such as server device 160). In some embodiments, the components 190 can be stored (or caused to be stored) in the server memory 180 by an administrator of the server device using the server database manager 176. The server database manager 176 can be configured to, for example, handle allocation of storage space within the server memory 180 for the storage of, for example, the components 190.

After at least a portion of the components 190 have been stored in the server memory 180, the relationship generator 174 can be configured to determine (e.g., resolve, identify) the relationships between the components 190. In some embodiments, the relationships between the components 190 can be determined (e.g., resolved, identified) on a component by component basis. For example, the relationship generator 174 can be configured to retrieve a component $C_4$ and can be configured to determine that component $C_4$ depends upon component $C_N$ for proper processing, or that component $C_N$ depends on component $C_4$ for proper processing. The dependent relationship between component $C_4$ and $C_N$ can be represented and stored as a relationship value such as relationship value $D_N$. More details related to determining relationships between components and storage of relationship values representing relationships are described in connection with, for example, FIGS. 3 through 5

During the Transfer Stage 210 (shown in FIG. 2), the set of components 10 and the relationship metadata 20 is transferred from the server device 160 on the server side of the network 100 to the client memory 140 of the client device 110 on the client side of the network 100. The transfer can be triggered in response to a request from the client device 110. In some embodiments, processing of a component (e.g., a primary component) such as component $C_1$ can be requested at the client device 110 in response to, for example, an interaction of a user with the client device 110. In response, the client processing module 134 can be configured to request component $C_1$ from the client database manager 136 of the client memory 140. If component $C_1$ is not already in the client memory 140 as determined by the client database manager 136, the client database manager 136 can be configured to request the component $C_1$ from the server device 160.

In the embodiment shown in FIG. 1, the server device 160 can be configured to send the component $C_1$ and related components $C_2$ and $C_3$, which define the set of components 10, along with the set of relationship metadata 20. All of the related components (i.e., the set of components 10) and relationship metadata (i.e., the set of relationship metadata 20) are sent as a group in a single response from the server device 160. The set of relationship metadata 20, which includes relationship values $D_1$ and $D_2$, represents the relationships between the components from the set of components 10. The set of components 10 can be selected from the components 190 for sending to the client device 110 based on the relationships between the components $C_1$, $C_2$, and $C_3$ as defined within the relationship metadata 194. In this embodiment, only the portion of the relationship metadata 194 (which is the set of relationship metadata 20) and the portion of the components 190 (which is the set of components 10) needed to process component $C_1$ is transferred to the client device 110 on the client side of the network 100.

As discussed, the components $C_1$, $C_2$, and $C_3$ are sent as the set of components 10 along with the set of relationship metadata 20. Because the relationships between the components from the set of components 10 and the relationship values representing the relationships have been determined (e.g., resolved, identified) at the server device 160 prior to the request being received at the server device 160 from the client device 110, the components $C_1$, $C_2$, and $C_3$ and the set of relationship metadata 20 can be sent all together (e.g., substantially at the same time, in response to the single request from the client device 110). Each of the components from the set of components 10 and/or the relationship values from the set of relationship metadata 20 is not sent in a piece-meal fashion in response to multiple requests from the client device 110 (i.e., via multiple request/response cycles). Accordingly, processing of the components at the client device 110 on the client side of the network 100 can be handled in an efficient fashion without significant time delay.

In some embodiments, components 190 can function as a library of components from which components (such as the set of components 10) can be selected for processing at the client device 110. Similarly, the relationship metadata 194 can function as a library of relationship values from which relationship values (such as the set of relationship metadata 20) can be selected when related to components requested (e.g., requested for processing at the client device 110) from the server device 160.

In this embodiment, the set of components 10 and the set of relationship metadata 20 is sent to the client device 110 on an as needed basis. In other words, the set of components 10 and the set of relationship metadata 20 is sent to the client device 110 when processing of one or more of the components that is not already stored at the client device 110 is to be performed. As a result, the component database 144 generally includes only a subset of the components 190 stored in the server memory 180 of the server 160, and the metadata database 142 includes only a subset of the relationship metadata 194 stored in the server memory 180 of the server 160. Thus, the resources of the client device 110 can be efficiently used and storage of large quantities of unused or unneeded data will not stored at the client device 110 in a dormant fashion.

During the Processing and Update Stage 210 (shown in FIG. 2), the components and relationship values transferred to the client device 110 from the server device 160 can be processed at the client device 110. For example, the component $C_1$ and the related components $C_2$ and $C_3$ can be processed at the client device 110 based on the set of relationship metadata 20. In this case, the set of components 10 are displayed within the display 120 when processed.

Because the set of components 10 and the relationship metadata 20, which are associated with the set of components 10, are stored locally within the client memory 140 of the client device 110 after being initially received during the Transfer Stage 220 (shown in FIG. 2), the set of components 10 can be processed at a later time without requesting (or receiving) the set of components 10 and/or the set of relationship metadata 20 from the server device 160. For example, when processing of the primary component—component $C_1$—is requested at the client device 110 in response to, for example, an interaction of a user with the client device 110, the component $C_1$, $C_2$, and $C_3$ can simply be retrieved from the local client memory 140 (by client database manager 136) and processed (by the client processing module 134) based on the relationship values $D_1$ and $D_2$. In this scenario, a request for the set of components 10 and/or the relationship metadata 20 is not necessary.

In such embodiments, the set of components 10 and/or the set of relationship metadata 20 can be stored for a relatively persistent period of time (e.g., more than ephemeral period of time). For example, the set of components 10 and/or the set of relationship metadata 20 can be stored in the client memory 140 long enough to be used in response to multiple processing requests.

During the Processing and Update Stage 210 (shown in FIG. 2), however, the client data manager 136 of the client device 110 can be configured request updates to any portion of the set of components 10 and/or any portion of the set of relationship metadata 20, if any. The request can be sent from the client device 110 with a timing that will not prevent or delay (e.g., substantially delay) processing of the set of components 10 based on the relationship metadata 20. For example, processing of one or more of the components from the set of components 10 can be triggered in conjunction with (e.g., before, substantially at the same time) a request for an update being sent to the server device 160.

In the event that an update is received from the server device 160 (in response to a request), the client device 110 can be configured to trigger re-processing, if necessary, of one or more of the components from the set of components 10 based on the updated component(s) and/or relationship value(s). The updated components and/or relationship values can be stored in the client memory 140 (e.g., in the metadata database 142 and/or the component database 144 of the client memory 140) by the client database manager 136. Outdated components and/or relationship values can be removed from the client memory 140 and/or replaced within the client memory 140 by the client database manager 136.

By requesting updates in this fashion, updates are requested and/or received on an as-needed basis. Accordingly, at least a portion of the components 190 and/or a portion of the relationship metadata 194 stored in the server memory 180 is mirrored within the client memory 140. In some embodiments, the mirroring within the client memory 140 of the portions of the components 190 and/or the relationship metadata 194 stored in the server memory 180 may be temporally delayed by the update frequency. The update frequency can be a function of the processing frequency of one or more of the components based on relationship metadata at the client device 110.

Although not shown, the basic stages of operation shown in FIG. 2 can be performed in parallel at the client device 110 and/or the server device 160. In some embodiments, for example, processing at the client device of a set of components that is not shown can be performed simultaneously with processing of the set of components 10. In some embodiments, the relationship generator 174 of the server device 160 can be configured to determine (e.g., resolve, identified) relationships related to several components in parallel.

In some embodiments, the basic stages of operation shown in FIG. 2 can include other stages of operation. For example, although not shown, the stages of operation shown in FIG. 2 can include a Clear Memory Stage where all or portion of component database 144 or the metadata database 142 stored in the client memory 140 can be cleared. Components that have not been processed and/or updated for a specified period of time (e.g., an age-out time period) can be removed from the client memory 140 by the client database manager 136. During such a stage a particular primary component can be cleared from the memory of the client memory 140. The primary component that was removed from the memory of the client memory 140 can be requested again during processing of the Transfer Stage 220. Accordingly, the Transfer Stage 220 can be performed with respect to the particular primary component more than once. More details, and variations, related to the stages of operation are discussed below (e.g., in conjunction with FIGS. 3 through 10).

Although not shown, in some embodiments, the client memory 140 can be implemented as more than one memory component (e.g., more than one random-access memory (RAM) component or disk drive memory) within the client device 110. In some embodiments, the client memory 140 can be, or can include, a non-local memory (e.g., a memory not physically included within the client device 110) on the client side of the network 100. For example, the client memory 140 can be, or can include, a memory shared by multiple client devices (not shown) on the client side of the network 100. In some embodiments, the client memory 140 can be associated with a server device (not shown) on the client side of network and configured to serve several client devices on the client side of the network 100.

Although the network 100 shown in FIG. 1 only includes a single client device 110 and a single server device 160, it should be understood that the devices shown in FIG. 1 are presented only by way of example. In some embodiments, the network 100 can include multiple client devices (such as client device 100) and/or multiple server devices (such as server devices 160). Also, although not shown in FIG. 1, the client device 110 and/or server device 160 can be configured to function within various types of network environments. For example, the network 100 can be, or can include, a local area network (LAN), a wide area network (WAN), and/or so forth. The network 100 can be, or can include, a wireless network and/or wireless network implemented using, for example, gateway devices, bridges, switches, and/or so forth. The network 100 can include one or more segments and/or can have portions based on various protocols such as Internet Protocol (IP) and/or a proprietary protocol. The network 100 can include at least a portion of the Internet.

The client device 110 can be, for example, a wired device and/or a wireless device (e.g., wi-fi enabled device) and can be, for example, a computing entity (e.g., a personal computing device), a mobile phone, a personal digital assistant (PDA) and/or so forth. The server device 160 can be, for example, a wired device and/or a wireless device (e.g., wi-fi enabled device). The server devices 160 can be, or can include, a server device (e.g., a web server) and/or a host device. The client device 110 and/or the server device 160 can be configured to operate based on one or more platforms (e.g., one or more similar or different platforms) that can include one or more types of hardware, software, firmware, operating systems, runtime libraries, and/or so forth.

In some embodiments, the client device 110 can represent a cluster of devices and/or the server device 160 can represent a cluster of devices (e.g., a server farm). In such an embodiment, the functionality and processing of the client device 110 (e.g., the client component manager 130 of the client device 110) can be distributed to several client devices of the cluster of client devices. Similarly, the functionality and processing of the server device 160 (e.g., the server component manager 170 of the server device 160) can be distributed to several devices of the cluster of server devices.

In some embodiments, one or more portions of the client device 110 and/or server device 160 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the client component manager 130 can be, or can include, a software module configured for processing by at least one processor (not shown). Similarly, one or more portions of the server component manager 170 can be a software module configured for processing by at least one processor (not shown). In some embodiments, the functionality of the client device 110 and/or the server device 160 can be included in different modules and/or components than those shown in FIG. 1. For example, although not shown, the functionality of the client processing module 134 can be included in a different module than the client processing module 134, or divided into several different modules.

Figure 3:
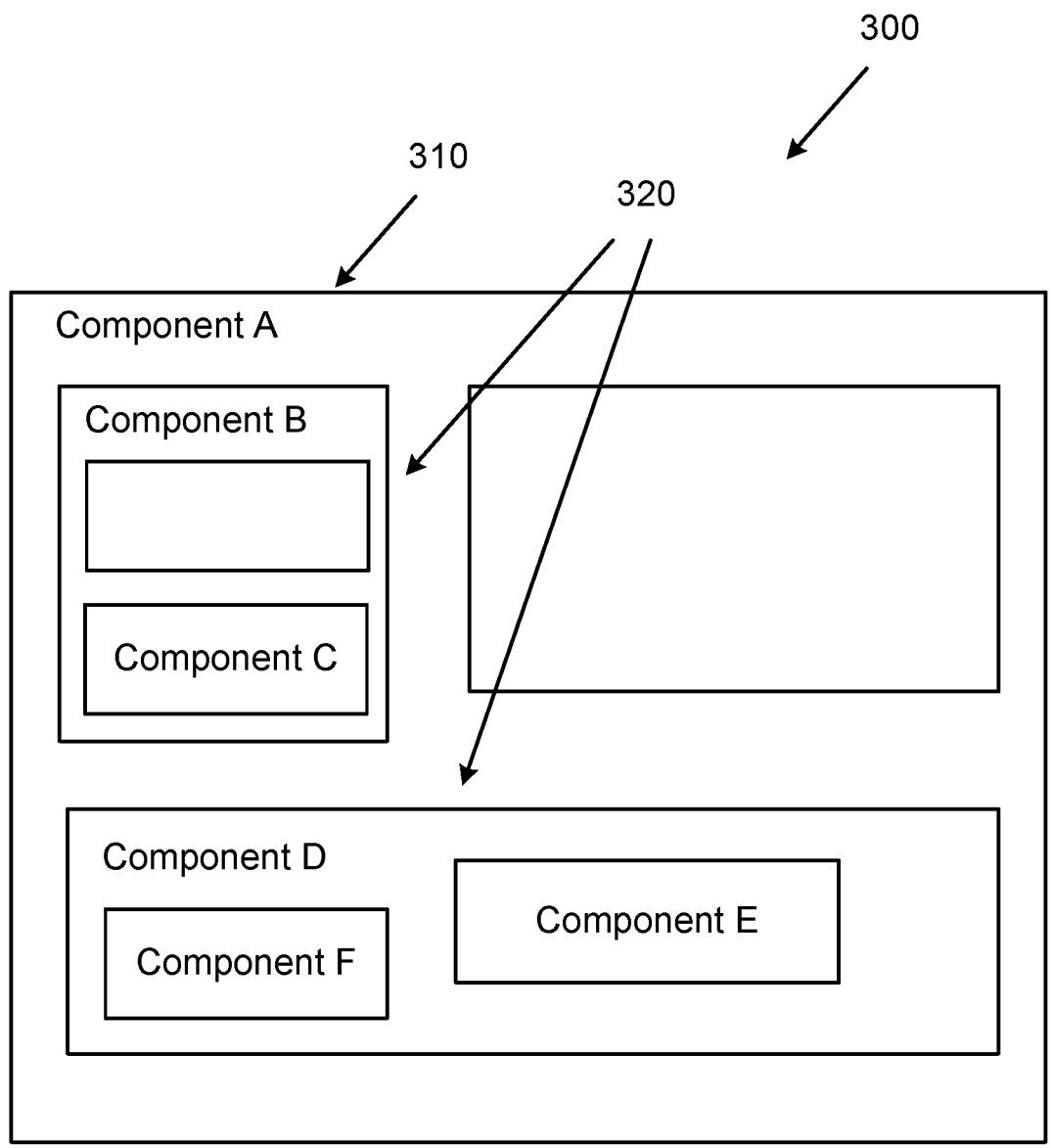
FIG. 3 is a block diagram that illustrates related components within an application, according to an embodiment.

FIG. 3 is a block diagram that illustrates related components within an application, according to an embodiment. Specifically, the components A, B, C, D, E, and F have different types of relationships (e.g., dependent relationships, non-dependent relationships) with one another. The components A, B, C, D, E, and F can collectively be referred to as a set of components 300. Although not shown, the set of components 300 can define at least a portion of, or can be included in, an application.

In this example embodiment, at least some of the components from the set of components 300 have a dependent relationship with other components from the set of components 300. In some embodiments, a first component can have a dependent relationship with a second component that can be characterized (or referred to) as the first component having a dependency on the second component when at least some portion of processing (e.g., display, execution) of the first component is dependent (e.g., contingent) on the processing of the second component. In such instances, the second component can be referred to as being dependent from the first component. In some embodiments, a dependency can be generally referred to as a processing dependency.

In some embodiments, a dependency (i.e., a processing dependency), which is a type of dependent relationship, can be characterized as an execution dependency, a visual dependency, and so forth. For example, a first component can have an execution dependency on a second component where execution of at least a portion of the first component is contingent on execution of the second component because the second component provides data to the first component. In some embodiments, a first component can have an execution dependency on a second component where execution of at least a portion of the first component cannot occur without execution of at least a portion of the second component (i.e., before execution of the portion of the first component). As another example, a first component can have a visual dependency on a second component when display of at least a portion of the second component is inside of the first component.

The relationships in the example shown in FIG. 3 are mostly dependent relationships that can be characterized as execution dependencies (also can be referred to as dependent execution relationships) and/or as visual dependencies (also can be referred to as visual relationships or as spatial relationships). Some of the relationships of the set of components 300 shown in FIG. 3 can also be characterized as hierarchical relationships where the components from the set of components 300 are related through a chain of relationships (e.g., a chain of parent-child relationships). In some embodiments, the relationships between components from the set of components 300 can be referred to as couplings between components.

In this example embodiment, component A is a primary component 310 (also can be referred to as a main component or as a root component) and components B, C, D, E, and F are subsidiary components 320. Component A, as the primary component 310, includes references and/or pointers at least some of the subsidiary components 320. In some embodiments, processing (e.g., execution, display) of the primary component 310 can be triggered before processing of one or more of the subsidiary components 320 is triggered for processing. In some embodiments, processing of one or more of the subsidiary components 320 can be triggered before processing of the primary component 310 is triggered.

In some embodiments, component A can be referred to as the primary component 310 because component A can be the first component from the set of components 300 called for processing (e.g., execution, rendering) by an application in response to an instruction triggered by a user. For example, a user may interact with an application and the interaction can cause the primary component (e.g., component A) to be called for processing. The subsidiary components (e.g., components B, C, D, E, and F) can be called for processing from the primary component, or from subsequently processed subsidiary components. In some embodiments, a component that is a primary component (e.g., component A) within a set of components (e.g., set of components 300) may not be a primary component (i.e., may be a subsidiary component) in another set of components. Similarly, in some embodiments, a component that is a subsidiary component (e.g., component D) within a set of components (e.g., set of components 300) may not be a subsidiary component (i.e., may be a primary component) in another set of components.

As shown in FIG. 3, the components A, B, C, D, E, and F have visual dependencies—many of which are visually nested dependencies. Specifically, component C is visually nested within component B, and component B is visually nested within component A. Similarly, components F and component E are visually nested within component D, and component D is visually nested within component A.

As shown in FIG. 3, component B has a visually nested relationship with component A that is on a same hierarchical level as the visually nested relationship between component D and component A. In other words, component B has a visual dependency on component A that is on the same hierarchical level (e.g., hierarchical visual dependency level) as the visual dependency of component D on component A. As shown in FIG. 3, component C has a visually nested relationship with component B that is on a same hierarchical level as the visually nested relationship between components E, F and component D. Components E and F can be referred to as being on a hierarchical level with respect to component A, but components E and F can be referred to as being on a different hierarchical level with respect to components B and D. The hierarchical levels (e.g., hierarchical visual dependency levels) can be referred to as first-tier hierarchical levels, second-tier hierarchical levels, and so forth. In some embodiments, because component C is visually nested within component B, and component B is visually nested within component A, components A, B, and C can be referred to as being hierarchically related with respect to visual dependencies. The hierarchical dependencies (e.g., hierarchical visual dependencies) from component A via component B can be characterized as a branch of hierarchical dependencies (e.g., hierarchical visual dependencies) and the hierarchical dependencies from component A via component D can be characterized as another branch of hierarchical dependencies.

As shown in FIG. 3, component F and component E have a visual relationship that is not nested. Component E has a visual placement that is a specified orientation with respect to component F. In other words, component E has a specified spatial orientation with respect to component F, and vice versa. Accordingly, component E and component F have a visual dependency that is not nested.

In this embodiment, the components from the set of components 300 not only have visual dependencies, but also have execution dependencies with respect to one another. For example, component A has an execution dependency upon components B, C, D, E, and F. Said differently, the execution of component A is dependent upon the execution of the subsidiary components—components B, C, D, E, and F. The execution dependency of component A upon components B and D is a direct execution dependency, but the execution dependency of component A upon components C, E, and F is an indirect (e.g., an attenuated) execution dependency because these execution dependencies are via components B and D, respectively. Specifically, the execution of component A is dependent upon the execution of component B and component D. The execution of component B is dependent upon the execution of component C. The execution of component D is dependent upon the execution of component E, and the execution of component E is dependent upon the execution of component F.

In some embodiments, the relationships between the components can be characterized with, for example, different levels (e.g., magnitudes) of relationship. For example, some of the relationships can be characterized as having different levels of integration. A relationship (e.g., an execution dependency, a visual dependency) between two components that is characterized as highly dependent (e.g., tightly coupled) can indicate that a first component cannot be processed (e.g., executed, displayed) without processing of a second component, or vice versa. A dependency (i.e., a processing dependency) between two components that is characterized as moderately dependent (e.g., moderately integrated) can indicate that although the two components have a dependent relationship, but that the first component can be processed (e.g., successfully executed/displayed) without processing of the second component, and vice versa. With moderately dependent relationships, the functionality of one of the two components may be affected if the other components is not processed (e.g., if processing the other component failed). A dependency between two components that is characterized as weakly dependent (e.g., loosely integrated) can indicate that although the two components have a dependent relationship, the first component can be processed without processing of a second component, and vice versa, and neither component would be adversely affected if processing the other component failed.

The levels of relationship described above are presented by way of example, and different levels of relationship can be implemented and/or characterized. For example, in some embodiments, additional levels, less levels, or different levels of relationship can be characterized in addition to those described above. In some embodiments, the level of relationship between components can be represented within a relationship value, and can be stored within a metadata database.

In some embodiments, processing (e.g., triggering of execution, requests for updates) at a client device and/or server device of the components can be based on the levels of relationship between components. In some embodiments, certain relationships between components can be given priority (or precedence) over other relationships. Accordingly, the processing order related to components can be defined or affected by the levels of relationship between components. For example, the processing (e.g., display, execution) of components that are highly dependent on one another can be performed with a higher priority than components that are only moderately dependent upon one another. In some embodiments, for example, requests for updates related to weakly dependent components can be sent after requests for updates related to highly dependent components are sent. In some embodiments, individual components (rather than relationships between components) can be assigned a processing priority, and can be processed at a client device and/or a server device based on the processing priority.

In the example embodiment shown in FIG. 3, the execution of component A is highly dependent upon the execution of component B and component D. The execution of component B and the execution of component D are moderately dependent upon the execution of component C. The execution of component D is only weakly dependent upon the execution of component E. The execution of component E is highly dependent upon the execution of component C.

Similar to the visual dependencies, the components from the set of components 300 can be hierarchically related with respect to execution dependencies. For example, because component A has an execution dependency on component B, and component B has an execution dependency on component C, components A, B, and C can be referred to as being hierarchically related with respect to execution dependencies. In some embodiments, component A can be referred to as having a hierarchical execution dependency on component B, and components C can be referred to as having a different hierarchical execution dependency on component A. In other words, component A has a dependent execution relationship with component B that is on a different hierarchical level as the dependent execution relationship between components B and component A. Each of the hierarchical execution dependency levels can be referred to as a first-tier hierarchical execution dependency level, a second-tier execution dependency hierarchical level, and so forth. The hierarchical execution dependencies from component A via component B can be characterized as a branch of hierarchical execution dependencies and the hierarchical execution dependencies from component A via component D can be characterized as another branch of hierarchical execution dependencies.

In some embodiments, a component from the set of components 300 can have a non-dependent relationship with another component from the set of components 300. For example, a first component and a second component can be identified as components that are to be processed at the same (e.g., triggered for processing at the same time, processed during overlapping time periods), but do not have an execution dependency or visual dependency on one another.

In some embodiments, a first component and a second component can have different portions with dependencies on each other. For example, a first component can have a first portion that has an execution dependency on a first portion of a second component, and the second component can have a second portion that has an execution dependency on a second portion of the first component.

In some embodiments, multiple instances of a particular component can be associated with another component. For example, in an alternative embodiment, component C, which is visually nested within component B, could be a first instance of component C, and a second instance of component C (not shown) could have a relationship (e.g., visually nested relationship, a dependent relationship) with component B or component D.

In FIG. 3, the visually nested relationships are mostly aligned with the execution dependencies. For example, the components that are visually nested also have dependent relationships. Specifically, component B is visually nested within component A, and component A has an execution dependency on component B. Similarly, component C is visually nested within component B, and component B has an execution dependency on component C. Component E and component F, however, do not have a visually nested relationship, but component E has an execution dependency on component F. In some embodiments, a component may have an execution dependency on a component that is not displayed within an application. In some embodiments, the levels of relationship for different types of relationships may not be aligned with one another. For example, two components that have a highly dependent visual relationship may have a weakly dependent execution relationship. Said differently, as illustrated by the example shown in FIG. 3, the different types of relationships may or may not overlap with one another and may or may not be mutually exclusive.

In some embodiments, the relationships between components can be determined (e.g., resolved, identified) by, for example, a relationship generator (such as the relationship generator 174 shown in FIG. 1) based on an analysis of the component. For example, a relationship generator can determine that component B should be visually nested within component A, and that component A has a highly dependent execution dependency on component B by analyzing the code of and/or metadata related to component B. In some embodiments, the relationships can be based on an analysis that reveals that component A includes one or more references to component B and/or includes one or more modules that are dependent upon the functionality of modules included in component B. In some embodiments, the relationships between components can be determined through modeling of the components and/or actual processing (e.g., execution, display) of the components. A timing diagram that illustrates a server device configured to determine relationships (e.g., dependent relationships) between components is shown in FIG. 4.

Figure 4:
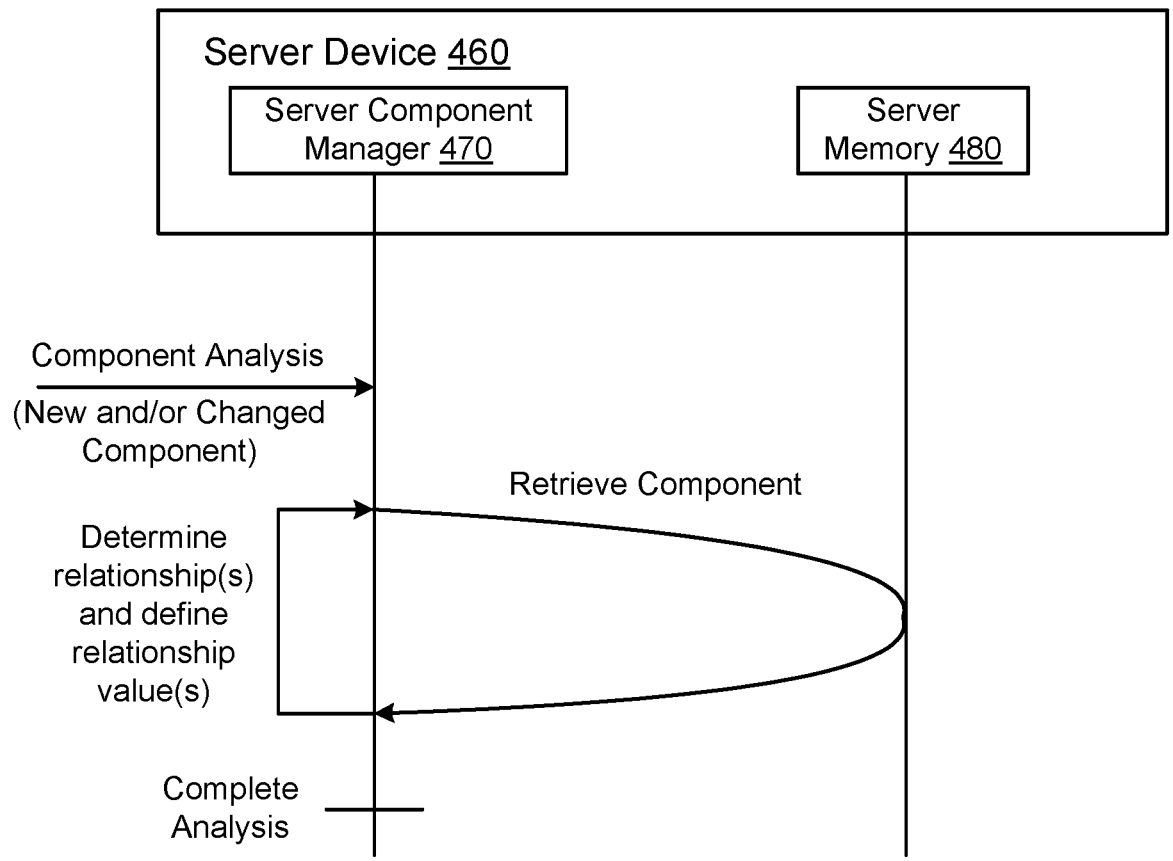
FIG. 4 is a block diagram that illustrates a timing diagram of a server device configured to determine relationships between components.

As shown in FIG. 4, a server device 460 includes a server component manager 470 and a server memory 480. The server component manager 470 is configured to receive a component analysis request. The component analysis request can be triggered in response to a new component being stored in the server memory 470 (also referred to as a new component event) and/or a change to a component in the server memory 470 (also referred to as a component change event). In some embodiments, the component analysis request can be triggered in response to a request from a user such as a network administrator. The method illustrated by the timing diagram can be performed during, for example, a relationship metadata generation stage (such as the Generation Stage 210 described in connection with FIG. 2).

In response to the component analysis request, a component is retrieved and the component is analyzed to determine (e.g., identify) relationships with other components. After the relationships have been determined, relationship values representing the relationships can be defined and stored, for example, in a metadata database (e.g., a metadata database in the server memory 480). An example of a metadata database is shown in FIG. 5.

The process of determining relationships and defining relationships values can be iteratively performed until all of the relationships (e.g., all dependent relationships, all non-dependent relationships) of other components, including hierarchically related components, with the selected component are determined, at which time the analysis is completed. Although not shown in FIG. 4, in some embodiments, the dependencies can be determined by a relationship generator of the server component manager 470, and the components can be retrieved from the server memory 480 by a server database manager.

For example, the timing diagram shown in FIG. 4 can be applied to the component relationships shown in FIG. 3. In response to a component analysis request received at the server component manager 470, component A (shown in FIG. 3) can be retrieved from the server memory 480. Based on analysis of component A, the server component manager 470 can be configured to determine that processing of component A is dependent on potentially two different sets (or branches) of components hierarchically related to component A—a first hierarchically-related set of components including/via component B and second hierarchically-related set of components including/via component D. The dependency of component A on components B and D, respectively, can be determined based on component B and D being identified, or otherwise referenced, within component A.

The server component manager 470 can be configured to analyze each of the different hierarchically-related sets of components separately. The order of analysis can be determined randomly and/or based on a priority associated with a level of relationship. In some embodiments, the server component manager 470 can be configured to analyze at least a portion of each of the hierarchically-related sets of components in parallel.

If starting with component B, the server component manager 470 can be configured to retrieve component B from the server memory 480. Based on an analysis of component B, the server component manager 470 can determine that execution of component B is dependent on component C. The server component manager 470 can be configured to retrieve component C from the server memory 480 and can be configured to determine that component C does not have any execution dependencies on other components. Similarly, the set of components hierarchically-related to component A via component D can be analyzed by the server device 460.

As described in the example above, the relationships between components are determined in a forward direction. In other words, the dependencies of a component on other components are determined based on the other components being identified, or otherwise referenced, within the component. In some embodiments, the server device 460 can be configured to analyze components randomly and can be configured to analyze relationships in both a forward and backward direction.

FIG. 5 is a diagram that illustrates an example of data that can be stored in a metadata database 500, according to an embodiment. As shown in FIG. 5, the metadata database 500 includes component identifiers 510, index values 520, relationship values 530, and priority values 540.

The component identifiers 510 can each be an identifier that can be used by a client device and/or a server device to identify or represent a particular component. For example, a client device can be configured to identify a component within a particular communication with a server device using at least one of the component identifiers 510. The component identifiers 510 shown in FIG. 5, include component identifier $P_1$ through component identifier $P_N$. Each of the component identifiers 510 can be unique identifier such as, for example, a universally unique identifier (UUID), or an identifier that is unique within a particular data space. The component represented by a particular component identifier can be referred to, in a shorthand fashion, by the component identifier. For example, the component represented by the component identifier $P_1$ can be referred to as component $P_1$.

The metadata database 500 shown in FIG. 5 is arranged so that the entries within a row are associated with a component represented by the component identifier 510 within that row. In other words, the index value 520, relationship value 530 and priority value 540 appearing on the same row as a component represented by a particular component identifier 510 are associated with that component.

The index values 520 can each be values used to identify additional information about a particular component. For example, the index values 520 can each be, or can include, a value used to identify a version of a particular component, or can each be used to identify a particular location of a component within a client memory and/or a server memory. The index values 520 can each be, or can include, an index into a client memory and/or a server memory. In some embodiments, the index values 520 can each be, or can include, cache keys. In some embodiments, the index values 520 can each be, or can include, a hash value used to locate a particular component value when stored in a memory (e.g., a client memory and/or a server memory).

The relationship values 530 can each be values used to represent a relationship of a particular component with another component. In the metadata database 500, the component identifiers listed in the relationship values 530 column represent components that have a dependent relationship with another component. Specifically, the component represented by the component identifier in the component identifiers 510 column is dependent on the components represented by the component identifiers listed in the relationship values 530 column. For example, the component represented by component identifier $P_1$ (shown in the component identifiers 510 column) is on the same row as the component identifiers $P_2$ and $P_3$ in relationship values 530 column. These entries collectively indicate that the component represented by component identifier $P_1$ is dependent (has a dependency) on component identifiers $P_2$ and $P_3$.

In some embodiments, the relationship values 530 can be different than those described in connection with FIG. 5. For example, in some embodiments, the relationship values 530 can include specific information about a processing order of each of the component(s) that have a dependent relationship with the component(s) identified in the component identifier 510 column. In some embodiments, the relationship values 530 can represent the type of dependency (i.e., a processing dependency), such as, for example, whether the dependency is a visual dependency, an execution dependency, and/or so forth. In some embodiments, the relationship values 530 can represent the level of the dependency, such as, for example, whether the dependency is high level dependency, a moderate level dependency, or a low level dependency.

As shown in the metadata database 500, component $P_1$ is dependent on component $P_3$ (shown in column 530), and component $P_3$ is dependent on component $P_5$ (shown in column 530). Component $P_1$ has a parent-child relationship with component $P_3$, and component $P_3$ has a parent-child relationship with component $P_5$ (shown in column 530). Accordingly, component $P_1$ can have a grandparent-grandchild relationship with component $P_5$. When component $P_1$ is referenced within component $P_3$ so that component $P_3$ is functionally called (e.g., triggered for processing) from component $P_1$, component $P_1$ can be dependent on component $P_3$ and component $P_3$ can be referred to as a child of component $P_1$. Accordingly, component $P_1$ can be referred to as a parent of component $P_3$. In some embodiments, component $P_1$ can be referred to as being hierarchically related to components $P_3$ and $P_5$, and vice versa.

The priority values 540 can each be values that represent a priority of a particular component and/or relationship represented by a relationship value. A priority value representing a high priority and associated with a component can cause that component to be processed (e.g., loaded) before another component with a priority value representing a lower priority. The priority values in the metadata database 500 represent priority values of the relationship values 530. The priority value of Q1 (shown in column 540), which represents a high priority, indicates that the dependencies (shown in column 530) associated with the component represented by component identifier $P_1$ (shown in column 510) have a higher priority than the dependencies (shown in column 530) associated with the component represented by component identifier $P_3$, which is associated with the lower priority value of Q2 (shown in column 540). Accordingly, the dependencies with a relatively high priority may have, for example, processing priority, or may supersede dependencies with a relatively low priority.

In some embodiments, one or more of the values shown in the metadata database 500 can be combined in a single value. For example, in some embodiments, the component identifier 510 and the index value 520 can be conflated into a single value. In some embodiments, the relationship between components can be predefined by, for example, an administrator and can be, for example, manually stored in a metadata database such that metadata database 500. In some embodiments, values in addition to those shown in FIG. 5 can be stored in the metadata database 500. For example, information about the dependency level of a relationship can be stored in the metadata database 500.

Figure 6:
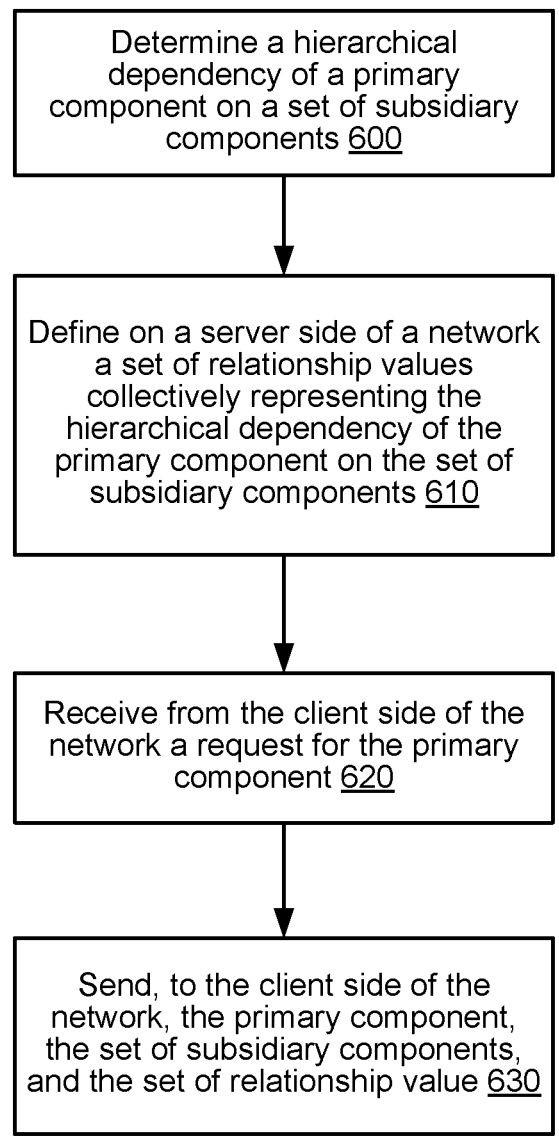
FIG. 6 is a flowchart that illustrates a method for processing a set of relationship values and components.

FIG. 6 is a flowchart that illustrates a method for processing a set of relationship values and components. The method shown in FIG. 6 can be performed at, for example, a server device on a server side of a network.

As shown in FIG. 6, hierarchical dependencies of a primary component on a set of subsidiary components is determined (block 600). The primary component can have a dependency on a portion of (e.g., one or more) subsidiary components from the set of subsidiary components. The portion of subsidiary components can have a dependency on another portion of (e.g., one or more) subsidiary components from the set of subsidiary components. One or more levels of dependencies can collectively define the hierarchical dependencies of the primary component on the set of subsidiary components.

A set of relationship values collectively representing the hierarchical dependencies of the primary component on the set of subsidiary components are defined on a server side of the network (block 610). The relationships values can be defined on the server side of the network as one or more of the dependencies are determined. Each of dependencies of the primary component on the set of subsidiary components can be determined starting with the primary component using an iterative process such as that shown in FIG. 4.

A request for the primary component is received from the client side of the network (block 620). The request for the primary component can be received from a client device on the client side of the network. The request can be received at a server device on a server side of the network. The primary component can be selected for processing at a client device on the client side of the network in response to a user-triggered instruction. For example, a user may cause or request processing of the primary component at a client device. In response, the client device can be configured to query (e.g., check) a local memory of the client device for the primary component. If the primary component is not resident (e.g., not stored) in the local memory of the client device, the client device can be configured to send a request for the primary component from the client side of the network to a server device on the server side of the network.

The primary component, the set of subsidiary components, and the set of relationships values are sent to the client side of the network (block 630). The primary component, the set of subsidiary components, and the set of relationship values can be sent to the client side of the network in response to the request. The set of subsidiary components and the relationship values are sent, along with the primary component, so that each of the subsidiary components from the set of subsidiary components can be processed based on the relationship values on the client side of the network without multiple serial requests being sent. In other words, each of the subsidiary components will not have to be requested and then sent to the client side of the network in a serial fashion. The set of subsidiary components and relationship values are sent along with the primary component so that the set of subsidiary components can be processed in an expeditious and efficient fashion on the client side of the network.

In some embodiments, blocks 600 and 610 can be performed during a generation stage (such as the Generation Stage 210 described in connection with FIG. 2) and blocks 620 and 630 can be performed during a transfer stage (such as the Transfer Stage 220 described in connection with FIG. 2).

Figure 7:
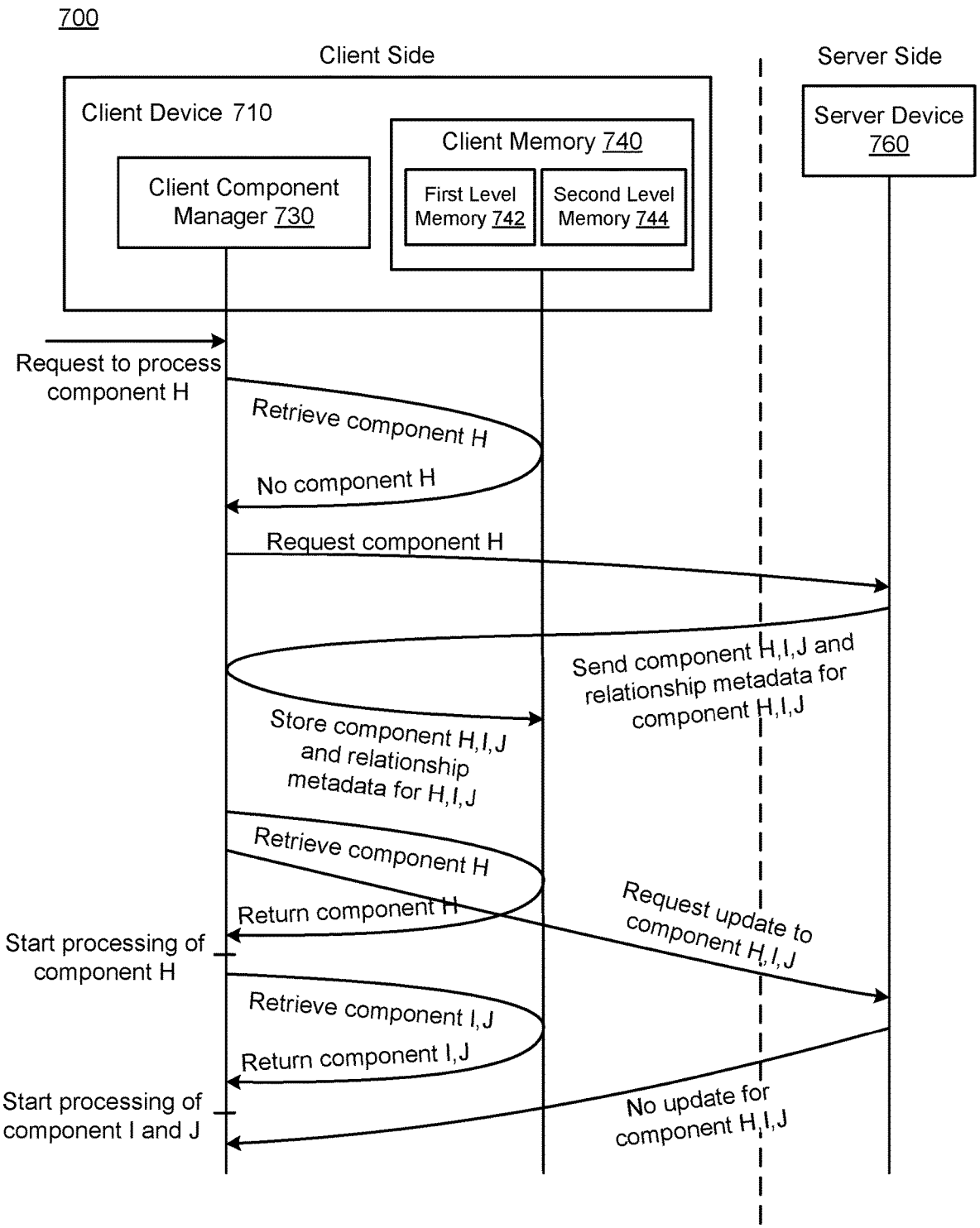
FIG. 7 is a timing diagram that illustrates processing of a set of components on a client side of a network at a client device.

FIG. 7 is a timing diagram that illustrates processing of a set of components on a client side of a network 700 at a client device 710. As shown in FIG. 7, a client device 710 is disposed on a client side of a network 700, and a server device 760 is disposed on a server side of the network 700. The client device 710 includes a client component manager 730 and a client memory 740.

As shown in FIG. 7, a request to process component H is received at the client component manager 730 of the client device 710. The request to process component H can be triggered in response to a user-triggered interaction with the client device 710. Component H, because it is the component being requested for processing, can be characterized as a primary component or as a main component.

The client component manager 730 can be configured to send a request for (e.g., a request to retrieve/fetch) component H to the client memory 740. As shown in FIG. 7, the client memory 740 sends an indicator to the client component manager 730 that component H is not stored (or is no longer stored) in the client memory 740. In some embodiments, the client memory 740 can be configured to store (e.g., store in a registry, store in a table) information about which components are stored in the client memory 740. For example, in some embodiments, the client memory 740 can be configured to query (e.g., check) a metadata database (not shown) for information about component H. If an entry related to component H is absent from a metadata database, the client memory 740 can be configured to determine that component H is not stored and/or has not previously been stored in the client memory 740. The client memory 740 can be configured to send an indicator communicating that information to, for example, another portion of the client device 710 and/or the server device 760.

In response to the indicator that component H is not stored locally in the client memory 740, the client component manager 730 is configured to send a request for component H to the server device 760 on the server side of the network 700. The request can include, for example, a component identifier and/or an index value that can be used by the server device 760 to send the proper component (e.g., requested component) to the client device 710.

In response to the request for component H, the server device 760 can be configured to send component H and components I and J, which have a relationship (e.g., a dependent relationship) with component H. The server device 760 can also be configured to send relationship metadata including relationship values representing relationships between components I and J and component H. In some embodiments, components I and J can be referred to as subsidiary components, related components, or as dependent components (if the relationships are dependent relationships).

As shown in FIG. 7, components H, I, and J and the relationship metadata for components H, I, and J are stored in the client memory 740 after being received at the client component manager 730. The relationship metadata can be stored in a metadata database (e.g., an existing metadata database) at the client memory 740. After the components H, I, and J and the relationship metadata for components H, I, and J have been stored in the client memory 740, component H can be retrieved for processing by the client component manager 710 from the client memory 740. Processing (e.g., execution, rendering within a display (not shown)) of component H is started by the client component manager 730 in response to component H being returned from the client memory 740.

In some embodiments, one or more portions of the components H, I, and J and/or relationship metadata associated with components H, I, and J can be returned (e.g., sent) to the client component manager 730 of the client device 710 in a serial fashion (e.g., in a serial fashion via several responses). For example, in response to the request for component H, the server device 760 may only send components H and J in an initial response because component I is not ready or available for sending to the client component manager 730. When component I is ready or available for sending to the client component manager 730, the server device 760 can be configured to send component I to the client component manager 730 without an additional request from the client component manager 730.

As shown in FIG. 7, a request for an update to components H, I, and J is sent to the server device 760 on the server side of the network 700. The request for the update is sent before component H is returned from the client memory 740 to the client component manager 730 for processing and also before processing of component H is started. In some embodiments, a request for an update to components H, I, and J can be sent before component H is retrieved from the client memory 740, or after component H is returned from the client memory 740.

In some embodiments, the request for the update can be, or can include, information about the version of one or more of the components currently stored at the client device 710, index value(s) (e.g., a cache key) and/or component identifier(s) used to identify one or more components, date/time stamp information indicating when one or more of components was received and/or stored at the client device 710, and/or so forth. In some embodiments, the request for an update to one or more components can also include a request for an update to relationship metadata associated with the component(s). In some embodiments, an update request can be defined by the client component manager 730 for one component, or for multiple components as shown in FIG. 7. In some embodiments, a request for an update to one or more components (and/or relationship metadata) can be sent from the client device 710 to the server device 760 on a periodic basis, a random basis, a scheduled basis, and/or so forth.

After processing of component H has been started, components I and J can be retrieved for processing by the client component manager 710 from the client memory 740. Component I and component J can be retrieved for processing in response to component I and component J being called for processing in component H. In some embodiments, component I and component J can be retrieved for processing based on the relationship metadata indicating that component H is related to component I and component J.

Although component I and component J are retrieved at the same time as shown in FIG. 7, in some embodiments, component I and component J can be retrieved and/or processed during different offset time periods in a staggered fashion, in a serial fashion, or in parallel.

Because components I and J are received and stored locally in the client memory 740 in response to the request for component H, the client device 710 can process components I and J immediately after starting processing of component H. A separate request to retrieve component I and/or component J from the server device 760 is not needed. Although not shown, in some embodiments, component I and/or component J can be retrieved and/or processed during a time period overlapping with a time period during which component H is retrieved and/or processed.

As shown in FIG. 7, an indicator that there is no update for components H, I, and J is sent from the server device 760 on the server side of the network 700 to the client component manager 730 on the client side of the network 700. An example of a scenario where updates are received in response to a request for updates is shown and described in connection with FIG. 10.

Although not shown, in some alternative embodiments, a request for an update to components H, I, and J is not sent from the client component manager 730 to the server device 760 because the components H, I, and J were requested and received from the server device 760. In some embodiments, a request for an update to one or more components may only be sent if the component has been previously started for processing at the client device 710. In other words, a request for an update may not be sent in response to the component being retrieved from the client memory 740 for the first time and/or processed for the first time at the client device 710. In some embodiments, a request for an update to one or more components may only be sent if the component(s) was received after a threshold period of time has passed and/or after the component(s) has been retrieved and/or a processed a specified number of times. For example, a request for an update to a component that has been triggered for processing may only be sent if the component has been stored in memory for longer than a threshold period of time.

As shown in FIG. 7, the client memory 740 includes a first level memory 742 and a second level memory 744. The first level memory 742 and the second level memory 744 can be different types of memories associated with the client device 710. For example, the first level memory 742 can be, or can include, a buffer or a cache, and the second level memory 744 can be, or can include, a hard drive, or a relatively persistent type of memory. In such embodiments, the first level memory 742 can function as a cache or buffer where components and/or relationship metadata is stored as the components and/or relationship metadata is being actively processed (e.g., executed within an application), retrieved, and/or updated. Other components and/or relationship metadata that is not being actively processed, retrieved and/or updated can be maintained in the second level memory 744. In some embodiments, more level of memory than those shown in FIG. 7 can be associated, or included in, the client memory 740.

In some embodiments, when the client memory 740 of the client device 710 is queried (e.g., checked) to determine whether or not a component (e.g., a primary component and/or subsidiary component(s)) and/or relationship metadata is stored in the client memory 740, multiple levels of memory (e.g., the first level memory 742 and the second level memory 744) can be queried. For example, if the component and/or relationship metadata is not resident (e.g., not stored) in the first level memory 742, the second level memory 744 can be queried (e.g., checked) for the component and/or relationship metadata.

Although not shown, in some embodiments, component H can be immediately started for processing when components H, I, and J, and the relationship metadata for components H, I, and J have been received from the server device 760 on the server side of the network. Specifically, component H can be triggered for processing before, or while components H, I, and J, are being stored in the client memory 740. In some embodiments, processing of one or more of components (e.g., components H, I, and/or J) can be started using a processing buffer (e.g., the first level memory 742), while the component(s) are being stored in a more persistent type of memory (e.g., the second level memory 744). Similarly, one or more portions of the relationship metadata (e.g., relationship metadata for components H, I, and/or J) can be used from a processing buffer (e.g., the first level memory 742), while the component(s) are being stored in a more persistent type of memory (e.g., the second level memory 744).

Although not shown, in some embodiments, the server device 760 on a server side of the network can be configured to query the client device 710 on the client side of the network to determine whether one or more components (e.g., a subsidiary component) and/or one or more portions of relationship metadata do not need to be sent to the client device 710 on the client side of the network. The server device 760 can confirm whether one or more components and/or one or more portions of relationship metadata are stored at the client device 710 so that the server device 760 will not needlessly send duplicative information to the client device 710. For example, in response to the request for component H, the server device 760 can query the client device 710 to determine whether or not component I or component J (or updated versions of component I or component J) are already stored at the client device 710. If only component I (or only an updated version of component I and an out-dated version of component J) is already stored in the client memory 740 of the client device 710, the server device 760 can be configured to send only component J (or an updated version of component J) to the client device 710.

Figure 8:
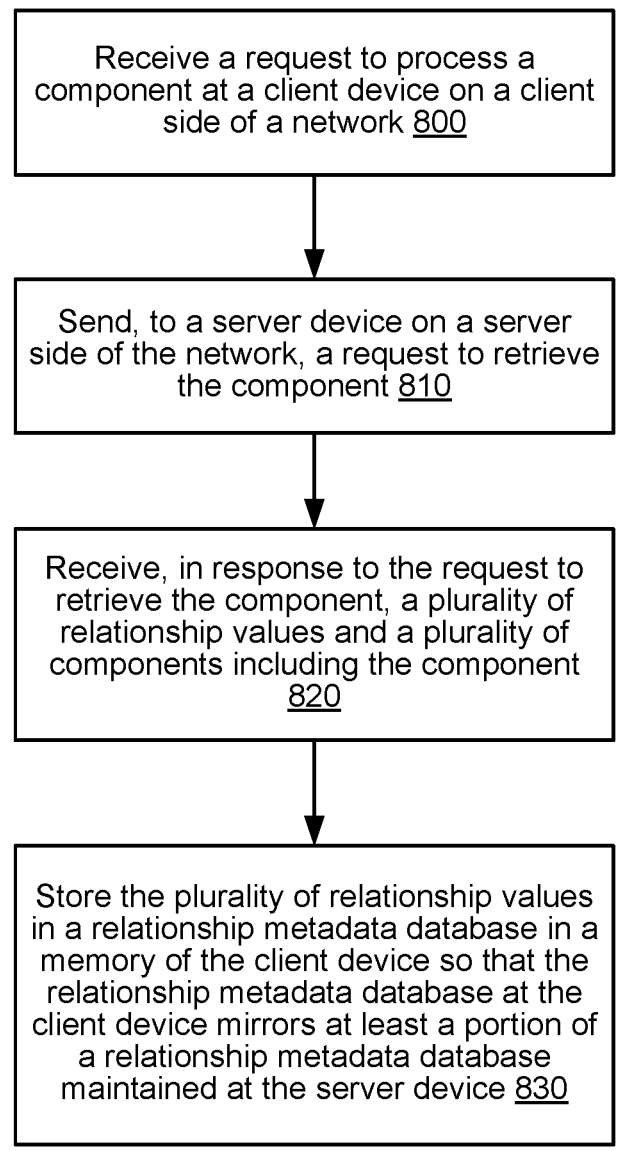
FIG. 8 is a flowchart that illustrates a method for a client device to request a component and relationship values from a server device.

FIG. 8 is a flowchart that illustrates a method for a client device to request a component and relationship values from a server device. The method shown in FIG. 8 can be performed, for example, during a transfer stage such as the Transfer Stage 220 shown in FIG. 2.

As shown in FIG. 8, a request to process a component at a client device on a client side of a network is received (block 800). The request to process can be triggered in response to an interaction of a user with the client device.

A request to retrieve the component is sent to a server device on a server side of the network (block 810). The request to retrieve the component can be sent to the server device via several components (e.g., a gateway device, a router device) within the network. In some embodiments, the network can be, for example, a local area network (LAN).

A plurality of relationship values and a plurality of components including the component are received (block 820). The plurality of relationship values and the plurality of components including the component can be sent to and received at the client device on the client side of the network from the server device in response to the request. Each relationship value from the plurality of relationship values can represent at least a portion of a relationship (e.g., a dependent relationship) between one component from the plurality of components and another component from the plurality of components.

The plurality of relationship values are stored in a relationship metadata database in a memory of the client device so that the relationship metadata database at the client device mirrors at least a portion of a relationship metadata database maintained at the server device (block 830). Although not shown in FIG. 8, the plurality of components can be stored in a component database in the memory of the client device so that the component database at the client device mirrors at least a portion of a component database maintained at the server device. The client device can be configured to request updates for at least a portion of the plurality of components and/or at least a portion of the plurality of relationship values from the server device in response to a request to process one or more of the components, on a periodic basis, in accordance with a schedule, and/or so forth. The server device can be configured to send (e.g., push) updates (without receive a request from the client device) related to at least a portion of the plurality of components and/or at least a portion of the plurality of relationship values to client device on a periodic basis, in accordance with a schedule, in response to a change to the portion of the plurality of components and/or the portion of the plurality of relationship values, and/or so forth.

Figure 9:
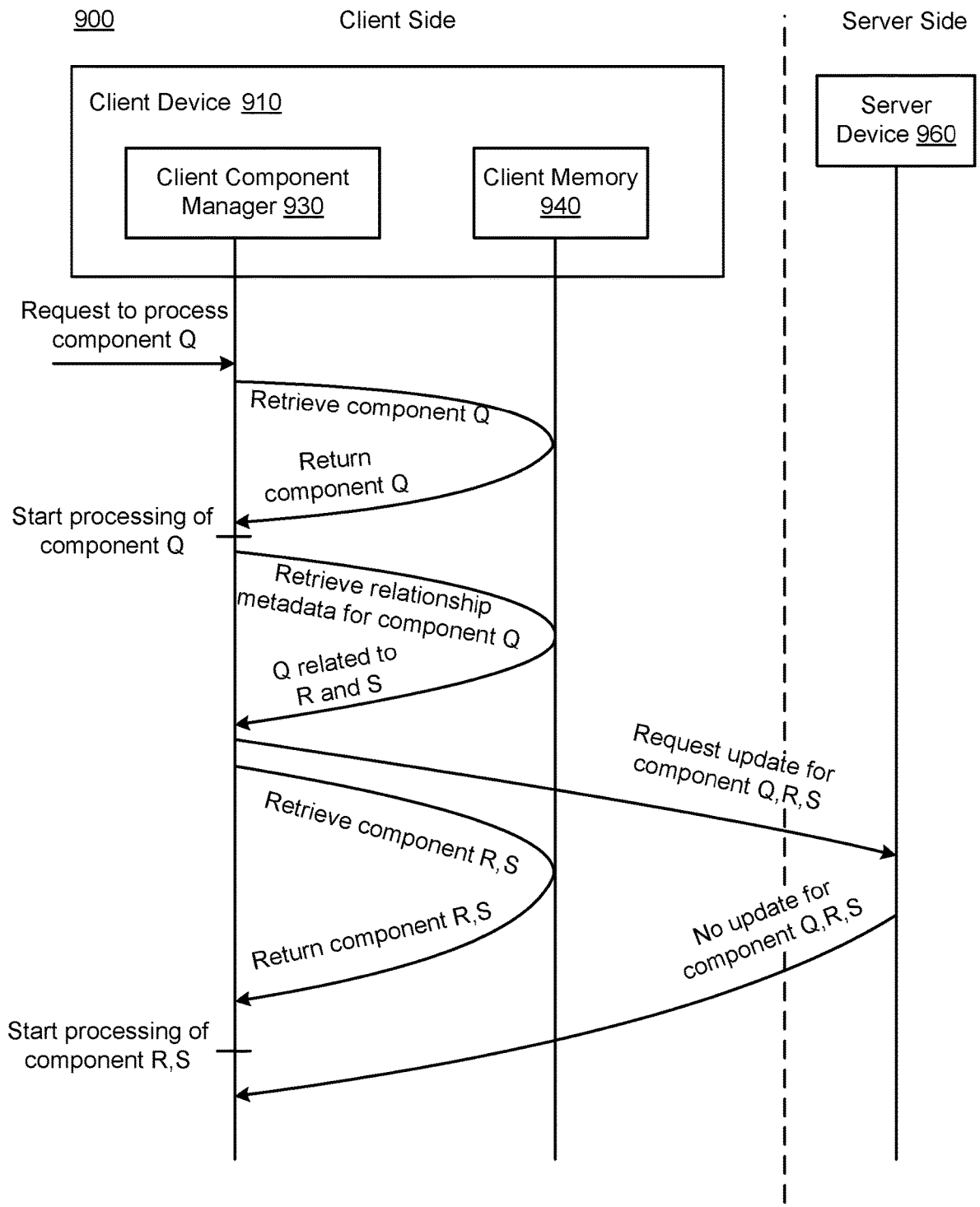
FIG. 9 is another timing diagram that illustrates processing of a set of components on a client side of a network at a client device.

FIG. 9 is another timing diagram illustrating processing of a set of components on a client side of a network 900 at a client device 910. As shown in FIG. 9, a client device 910 is disposed on a client side of a network 900, and a server device 960 is disposed on a server side of the network 900. The client device 910 includes a client component manager 930 and a client memory 940.

As shown in FIG. 9, a request to process component Q is received at the client component manager 930 of the client device 910. The request to process component Q can be triggered in response to a user-triggered interaction with the client device 910. Component Q, because it is the component being requested for processing (e.g., being request first in time relative to the other components for processing), can be characterized as a main component or as a primary component.

As shown in FIG. 9, a request for component Q is sent by the client component manager 910 to the client memory 940. In response to the request for component Q, the client memory 940 returns (e.g., sends) component Q to the client component manager 910. Because component Q is stored locally in the client memory 940, the client component manager 930 does not send a request for component Q to the server device 960. Processing (e.g., rendering within a display (not shown), execution) of component Q is started by the client component manager 930 in response to component Q being returned from the client memory 940.

As shown in FIG. 9, relationship metadata for component Q is retrieved from the client memory 940. As shown in FIG. 9, the relationship metadata indicates that component Q has a relationship with component R and S. In this embodiment, component Q has a processing dependency on component R, and component R has a processing dependency on component S. In some embodiments, a request for relationship metadata for component Q can be sent to the client memory 940 any time after the request to process component Q is received at the client component manager 930. For example, the request for relationship metadata for component Q can be sent to the client memory 940 substantially at the same time that a request to retrieve component Q is sent.

Based on the relationship metadata for component Q, component R and S are retrieved for processing by the client component manager 910 from the client memory 940. Processing (e.g., rendering within a display (not shown), execution) of component R and processing of component R are started by the client component manager 930 in response to component R and S being returned from the client memory 940.

Although component R and component S are retrieved at the same time as shown in FIG. 9, in some embodiments, component R and component S can be retrieved and/or processed during different offset time periods in a staggered fashion, in a serial fashion, or in parallel. In some embodiments, component R and component S can be retrieved for processing in response to component R being called for processing in component Q, in response to component S being called for processing in component R.

Based on the relationship metadata for component Q, which indicates that component Q has a relationship with component R and S, a request for an update to component Q, R, and S is sent to the server device 960 on the server side of the network 900 as shown in FIG. 9. The request for the update is sent before component R and S are retrieved from the client memory 940 for processing.

As shown in FIG. 9, an indicator that there is no update for component Q, R, and S is sent from the server device 960 on the server side of the network 900 to the client component manager 930 on the client side of the network 900. The indicator of no update for component Q, R, and S is received at the client component manager 930 on the client side of the network 900 after processing of component R and S have been started.

Figure 10:
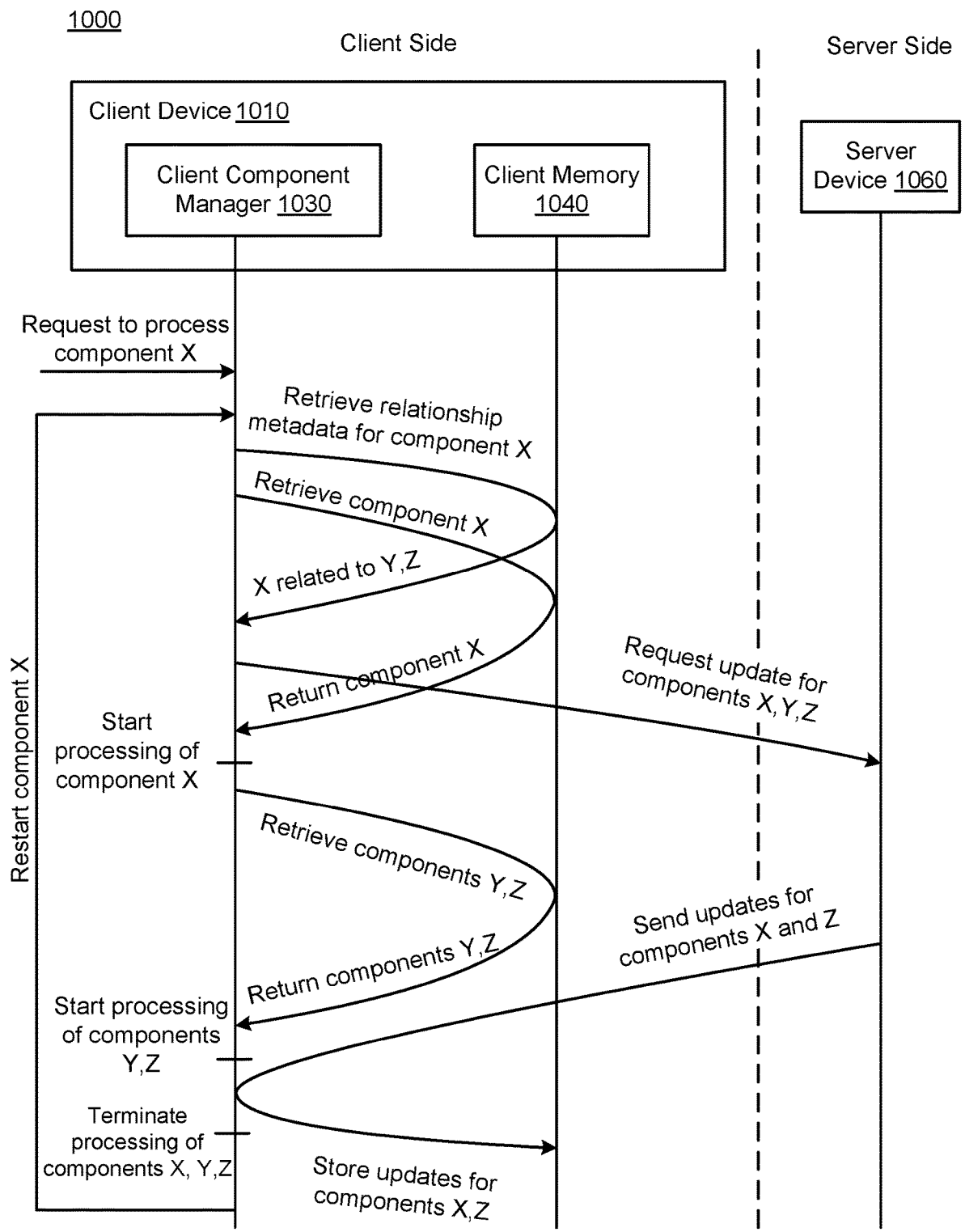
FIG. 10 is yet another timing diagram that illustrates processing of a set of components on a client side of a network at a client device.

FIG. 10 is yet another timing diagram illustrating processing of a set of components on a client side of a network 1000 at a client device 1010. As shown in FIG. 10, a client device 1010 is disposed on a client side of a network 1000, and a server device 1060 is disposed on a server side of the network 1000. The client device 1010 includes a client component manager 1030 and a client memory 1040.

As shown in FIG. 10, a request to process component X is received at the client component manager 1030 of the client device 1010. The request to process component X can be triggered in response to a user-triggered interaction with the client device 1010. Component X, because it is the component being requested for processing, can be characterized as a main component or as a primary component.

As shown in FIG. 10, relationship metadata for component X is retrieved from the client memory 1040 in response to the request to process component X. As shown in FIG. 10, the relationship metadata indicates that component X has a relationship with components Y and Z. In this embodiment, component X has a processing dependency on components Y and Z.

Based on the relationship metadata for component X, which indicates that component X has a relationship with component Y and Z, a request for an update to component X, Y, and Z is sent to the server device 1060 on the server side of the network 1000 as shown in FIG. 10. The request for the update is sent before components Y or Z are retrieved from the client memory 1040 for processing, and before component X is returned from the client memory 1040 for processing.

As shown in FIG. 10, a request for component X is sent by the client component manager 1010 to the client memory 1040 after the request for the relationship metadata is sent. In response to the request for component X, the client memory 1040 returns component X to the client component manager 1010. Because component X is stored locally in the client memory 1040, the client component manager 1030 does not send a request for component X to the server device 1060. Processing (e.g., rendering within a display (not shown), execution) of component X is started by the client component manager 1030 in response to component X being returned from the client memory 1040.

In some embodiments, a request for relationship metadata for component X can be sent to the client memory 1040 any time after the request to process component X is received at the client component manager 1030. For example, the request for relationship metadata for component X can be sent to the client memory 1040 substantially at the same time that a request to retrieve component X is sent.

Based on the relationship metadata for component X, component Y and Z are retrieved for processing by the client component manager 1010 from the client memory 1040. Processing (e.g., rendering within a display (not shown)) of component Y and processing of component Z are started by the client component manager 1030 in response to component Y and Z being returned from the client memory 1040.

As shown in FIG. 10, updates (e.g., updated information) for component X and Z are sent from the server device 1060 on the server side of the network 1000 to the client component manager 1030 on the client side of the network 1000. In response to receipt of the updates at the client component manager 1030, processing of all of the components is terminated by the client component manager 1030. In some embodiments, the updates for component X and Z can includes updates of the components and/or relationship metadata associated with the components.

As shown in FIG. 10, the updates for components X and Z are stored in the client memory 740. In some embodiments, the updates for components X and Z can replace, or can be used to modify, the components and/or relationship metadata associated with the components. In some embodiments, the updates for components X and Z can be stored in a different location than the outdated information of components.

As shown in FIG. 10, after the updates are stored in the client memory 1040, processing of component X is restarted. In some embodiments, only the processing of component(s) being updated may be terminated and restarted. In such embodiments, processing of component(s) related to an updated component(s) may not be terminated and restarted. In some embodiments, only the processing of component(s) related to (e.g., directly related to) an updated component(s), and the updated component(s), may be terminated and restarted. For example, only the processing of component(s) within a hierarchically related chain or branch of an updated component(s), and the updated component(s), may be terminated and restarted FIGS. 6 through 10 illustrate embodiments where components and/or relationship metadata is sent from a server device on a server side of a network to a client device on a client side of a network in response to a request from a client device. These scenarios can be characterized as pull scenarios because the client device requests information from the server device.

In some embodiments, the server device can be configured to push components and/or relationship metadata to the client device. For example, in some embodiments, the server device can be configured to push (without a request from the client device) a certain set of components and/or relationship metadata (or updates thereof) to the client device that are frequently used by many client devices. The set of components can be selected based on historical usage data from one or more client devices.

In some embodiments, the server device can be configured to push (without a request from the client device) one or more updates to one or more components and/or relationship metadata based on information about the component(s) and/or relationship metadata stored at a particular client device. For example, a server device can be configured to send an update related to particular component based on information that the client device has requested the particular component in a prior transaction between the server device and the client device.

CONCLUSION

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A non-transitory computer-readable storage medium storing code representing instructions that when executed are configured to cause a processor to perform a process, the code comprising code to:
   receive a request to process a component at a client device on a client side of a network;
   send, to a server device on a server side of the network, a request to retrieve the component;
   receive, in response to the request to retrieve the component, a plurality of relationship values and a plurality of components including the component, each relationship value from the plurality of relationship values representing at least a portion of a dependent relationship between one component from the plurality of components and another component from the plurality of components;
   store the plurality of relationship values in a relationship metadata database in a memory of the client device, the relationship metadata database at the client device mirroring at least a portion of a relationship metadata database maintained at the server device; and
   trigger, starting at a time, processing of the plurality of components at the client device in an order based on the plurality of relationship values after the storing of the plurality of relationship values in the relationship metadata database of the client device.

2. The non-transitory computer-readable storage medium of claim 1, wherein the request to process the component is a first request to process the component, the first request is received at a first time at the client device,
   the code further comprising code to:
   access the plurality of relationship values in response to a second request to process the component, the second request being received at the client device at a second time after the first time, the plurality of relationship values representing a set of hierarchical relationships between the component and one or more remaining components from the plurality of components;

send to the server side of the network, in response to the second request to process the component, a request for an update of at least a portion of at least one of the plurality of relationship values or the plurality of components; and trigger, before a response to the request for the update is received, processing of at least a portion of the one or more remaining components from the plurality of components at the client device based on at least a portion of the plurality of relationship values.

3. The non-transitory computer-readable storage medium of claim 1, wherein the request to process the component is a first request to process the component, the code further comprising code to:

receive, after the time, a second request to process the component at the client device;

trigger, in response to the second request to process the component, processing of the plurality of components at the client device in the order based on the plurality of relationship values stored in the relationship metadata database of the client device;

send to the server side of the network, in response to the second request to process the component, a request for an update of at least a portion of at least one of the plurality of relationship values or the plurality of components;

receive a response to the request for the update; and trigger re-processing of a portion of the plurality of components based on the response.

4. The non-transitory computer-readable storage medium of claim 1, wherein the request to process the component is a first request to process the component, the code further comprising code to:

store the plurality of components in the memory of the client device in a component database;

trigger, in response to a second request to process the component, processing of the plurality of components at the client device in an order defined based on the plurality of relationship values stored in the relationship metadata database of the client device; and send to the server side of the network, in response to the second request to process the component, a request for an update of at least a portion of at least one of the plurality of relationship values or the plurality of components;

receive a response to the request for the update; and modify, at the client device and based on the response, at least one of (1) at least a portion of the plurality of components or (2) at least a portion of the plurality of relationship values.

5. The non-transitory computer-readable storage medium of claim 1, wherein the code further comprises code to:

send to the server side of the network, an indicator that a plurality of hierarchical dependencies has changed;

send to the server side of the network, a request for an update; and receive, in response to the request for an update from the client side of the network, a modified set of relationship values based on the changed hierarchical dependencies.

6. The non-transitory computer-readable storage medium of claim 5, wherein the plurality of hierarchical dependencies includes an indication of each dependent relationship of each subsidiary component from one or more remaining components from the plurality of components relating to the component.

7. The non-transitory computer-readable storage medium of claim 1, wherein the dependent relationship includes a first dependent relationship and the component is a first component, the code further includes code to cause the processor to process, in response to the request to receive the first component, at least a portion of a third component having a dependent relationship with a second component such that the first component, the second component, and the third component are hierarchically related.

8. A method comprising:

receiving a request to process a component at a client device on a client side of a network;

sending, to a server device on a server side of the network, a request to retrieve the component;

receiving, in response to the request to retrieve the component, a plurality of relationship values and a plurality of components including the component, each relationship value from the plurality of relationship values representing at least a portion of a dependent relationship between one component from the plurality of components and another component from the plurality of components;

storing the plurality of relationship values in a relationship metadata database in a memory of the client device, the relationship metadata database at the client device mirroring at least a portion of a relationship metadata database maintained at the server device; and triggering, starting at a time, processing of the plurality of components at the client device in an order based on the plurality of relationship values after the storing of the plurality of relationship values in the relationship metadata database of the client device.

9. The method of claim 8, wherein the request to process the component is a first request to process the component, the first request is received at a first time at the client device, the method further comprising:

accessing the plurality of relationship values in response to a second request to process the component, the second request being received at the client device at a second time after the first time, the plurality of relationship values representing a set of hierarchical relationships between the component and one or more remaining components from the plurality of components;

sending to the server side of the network, in response to the second request to process the component, a request for an update of at least a portion of at least one of the plurality of relationship values or the plurality of components; and triggering, before a response to the request for the update is received, processing of at least a portion of the one or more remaining components from the plurality of components at the client device based on at least a portion of the plurality of relationship values.

10. The method of claim 8, wherein the request to process the component is a first request to process the component, the method further comprising:

receiving, after the time, a second request to process the component at the client device;

triggering, in response to the second request to process the component, processing of the plurality of components at the client device in the order based on the plurality of relationship values stored in the relationship metadata database of the client device;

sending to the server side of the network, in response to the second request to process the component, a request for an update of at least a portion of at least one of the plurality of relationship values or the plurality of components;
receiving a response to the request for the update; and
triggering re-processing of a portion of the plurality of components based on the response.

11. The method of claim 8, wherein the request to process the component is a first request to process the component, the method further comprising:
storing the plurality of components in the memory of the client device in a component database;
triggering, in response to a second request to process the component, processing of the plurality of components at the client device in an order defined based on the plurality of relationship values stored in the relationship metadata database of the client device; and
sending to the server side of the network, in response to the second request to process the component, a request for an update of at least a portion of at least one of the plurality of relationship values or the plurality of components;
receiving a response to the request for the update; and
modifying, at the client device and based on the response, at least one of (1) at least a portion of the plurality of components or (2) at least a portion of the plurality of relationship values.

12. The method of claim 8, further comprising:
sending to the server side of the network, an indicator that a plurality of hierarchical dependencies has changed;
sending to the server side of the network, a request for an update; and
receiving, in response to the request for an update from the client side of the network, a modified set of relationship values based on the changed hierarchical dependencies.

13. The method of claim 12, wherein the plurality of hierarchical dependencies includes an indication of each dependent relationship of each subsidiary component from one or more remaining components from the plurality of components relating to the component.

14. The method of claim 8, wherein the dependent relationship includes a first dependent relationship and the component is a first component, the method further comprising:
in response to the request to receive the first component, setting at least a portion of a third component to have a dependent relationship with a second component such that the first component, the second component, and the third component are hierarchically related.

15. A client device on a client side of a network, the client device comprising:
a processor; and
a memory including:
a relationship metadata database configured to mirror at least a portion of a relationship metadata database maintained at a server device on a server side of the network, and
code segments configured to cause the processor to execute steps, the steps including:
receiving a request to process a component at the client device;
sending, to the server device, a request to retrieve the component;
receiving, in response to the request to retrieve the component, a plurality of relationship values and a plurality of components including the component, each relationship value from the plurality of relationship values representing at least a portion of a dependent relationship between one component from the plurality of components and another component from the plurality of components;
storing the plurality of relationship values in the relationship metadata database; and
triggering, starting at a time, processing of the plurality of components at the client device in an order based on the plurality of relationship values after the storing of the plurality of relationship values in the relationship metadata database of the client device.

16. The client device of claim 15, wherein the request to process the component is a first request to process the component, the first request is received at a first time at the client device,
the steps further including:
accessing the plurality of relationship values in response to a second request to process the component, the second request being received at the client device at a second time after the first time, the plurality of relationship values representing a set of hierarchical relationships between the component and one or more remaining components from the plurality of components;
sending to the server side of the network, in response to the second request to process the component, a request for an update of at least a portion of at least one of the plurality of relationship values or the plurality of components; and
triggering, before a response to the request for the update is received, processing of at least a portion of the one or more remaining components from the plurality of components at the client device based on at least a portion of the plurality of relationship values.

17. The client device of claim 15, wherein the request to process the component is a first request to process the component,
the steps further including:
receiving, after the time, a second request to process the component at the client device;
triggering, in response to the second request to process the component, processing of the plurality of components at the client device in the order based on the plurality of relationship values stored in the relationship metadata database of the client device;
sending to the server, in response to the second request to process the component, a request for an update of at least a portion of at least one of the plurality of relationship values or the plurality of components;
receive a response to the request for the update; and
trigger re-processing of a portion of the plurality of components based on the response.

18. The client device of claim 15, wherein the request to process the component is a first request to process the component,
the steps further including:
storing the plurality of components in a component database of the memory;
triggering, in response to a second request to process the component, processing of the plurality of components at the client device in an order defined based on the plurality of relationship values stored in the relationship metadata database; and sending to the server, in response to the second request to process the component, a request for an update of at least a portion of at least one of the plurality of relationship values or the plurality of components;

receive a response to the request for the update; and modify, at the client device and based on the response, at least one of (1) at least a portion of the plurality of components or (2) at least a portion of the plurality of relationship values.

19. The client device of claim 15, wherein the steps further include:

sending to the server, an indicator that a plurality of hierarchical dependencies has changed;

sending to the server, a request for an update; and receiving, in response to the request for an update, a modified set of relationship values based on the changed hierarchical dependencies.

20. The client device of claim 19, wherein the plurality of hierarchical dependencies includes an indication of each dependent relationship of each subsidiary component from one or more remaining components from the plurality of components relating to the component.

* * * * *